March 11, 1941.   A. E. KITTREDGE   2,234,561
LIQUID PROPORTIONING SYSTEM
Filed May 19, 1939
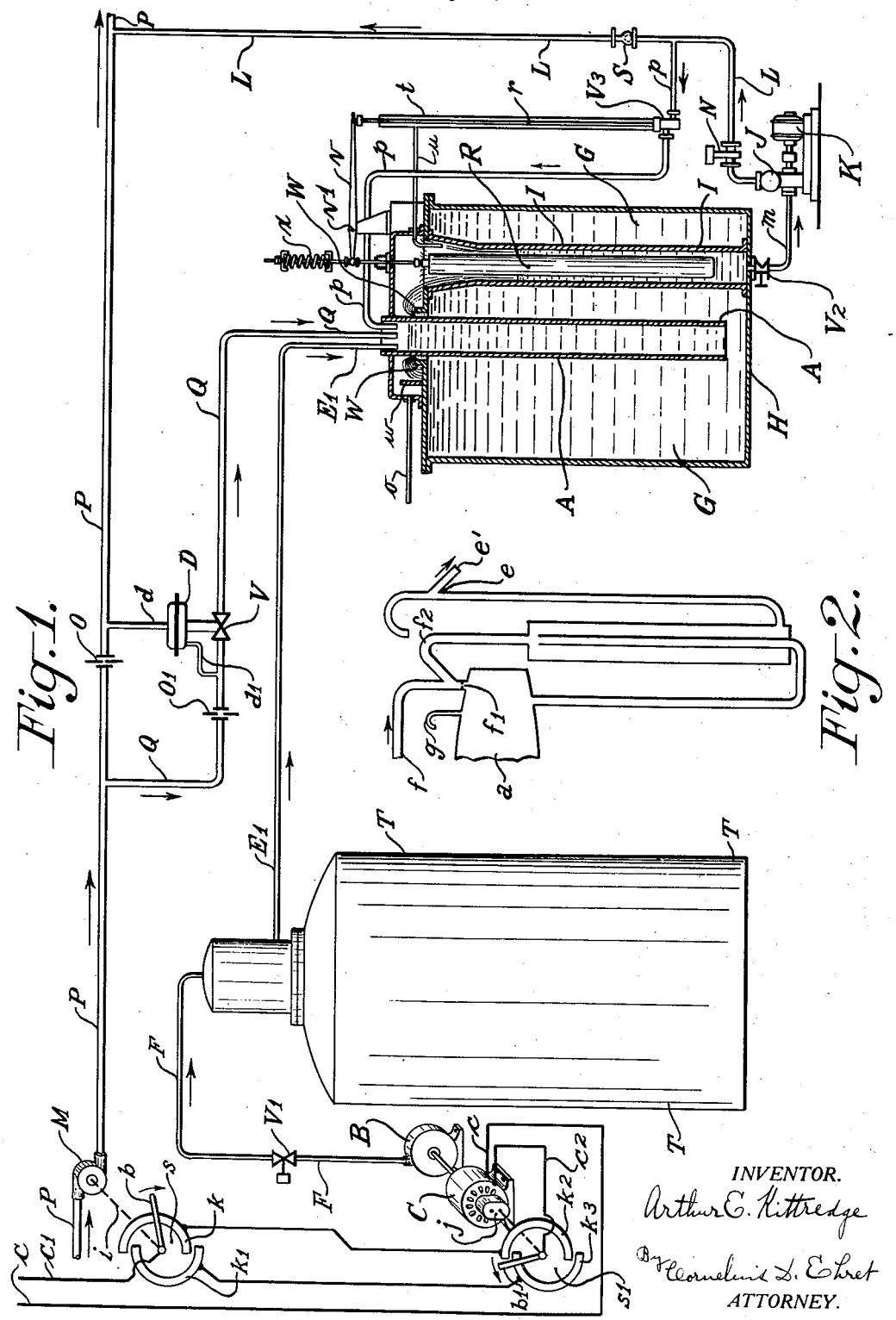
INVENTOR.
Arthur E. Kittredge
Cornelius D. Ehret
ATTORNEY.

Patented Mar. 11, 1941

2,234,561

UNITED STATES PATENT OFFICE 2,234,561

LIQUID PROPORTIONING SYSTEM

Arthur E. Kittredge, Audubon, N. J., assignor to Cochrane Corporation, Philadelphia, Pa., a corporation of Pennsylvania Application May 19, 1939, Serial No. 274,596

20 Claims. (Cl. 210—22)

My invention relates to systems for proportioning the feed of one liquid into mixture with another liquid, which is continuously flowing at constant or varying rate, to maintain substantially constant the proportions of the two liquids in the resultant mixture; and more particularly relates to primarily intermittent proportionment and delivery of said one liquid, especially liquid chemical or chemicals or a solution of a chemical or chemicals, with eventual continuous feed thereof to said other liquid at substantially constant or non-intermittent concentration at constant or varying rate in accord with the constant or varying rate of flow of said other liquid.

In accordance with my invention, the first liquid at first is intermittently fed from a supply thereof in successive volumes or amounts in intermittently proportional correspondence with successive predetermined definite or metered volumes of the second liquid, with a diluent, preferably comprising a predetermined proportion or fraction of the stream of the second liquid, into a mixing chamber of a dilution system; the mixture so continuously effected is discharged into a storage tank of the dilution system of relatively great volume in which the concentration becomes substantially constant and from which it is delivered into a maintained supply of volume which preferably is small as compared with the volume of the storage tank; delivery of the mixture to said supply is preferably at rate or in amount varying promptly in response to and in accord with momentary changes in the rate of flow to the mixing chamber of aforesaid fraction of the second liquid, and therefore in response to and in accord with like changes in the rate of flow of the main stream of the second liquid; the mixture, having attained constancy of concentration or proportion of the first liquid with respect to the diluent, is withdrawn from said supply and under pressure continuously delivered into the main stream of the second liquid, with continuous recirculation or return of a portion of the mixture from the discharge side of the supply in quantity or at a rate varying in accordance with variations in the volume of said supply, into aforesaid mixing chamber or storage tank; aforesaid return or recirculation of a variable portion of the mixture is such as to procure small or minimum variation in the volume of the mixture required in said supply to provide the different rates of feed of the mixture into the main stream of the second liquid.

More particularly in accordance with my invention, the first liquid, which may be an acid or other chemical, or a solution of acid or other chemical, for example sulphuric acid, preferably is primarily intermittently fed and proportioned as aforesaid, in such way that failure of the feeding equipment or control results in under-feed and not over-feed thereof, to the dilution system and thereafter into the main stream of the first liquid which latter may be, for example, boiler feed water which, because of its previous chemical treatment or otherwise, may be alkaline or of such content as to require or be benefited by admixture therewith of the chemical or acid solution at constant concentration and at varying rate, to neutralize or otherwise desirably condition the second liquid.

My invention resides in methods and apparatus of the character hereinafter described and claimed.

For an understanding of my methods, and for an illustration of one of the various forms my apparatus may take, reference is to be had to the accompanying drawing, in which:

Fig. 1, in part diagrammatic, shows part of the apparatus in section and part in elevation;

Fig. 2 is a diagrammatic illustration of one of the forms of primary intermittent proportioner utilizable in my system.

Referring to Fig. 1, the main stream of aforesaid second liquid, flowing at constant or varying rate, passes from the left toward the right through the pipe or conduit P, first through the meter M, of any suitable type, which measures the number of units of volume, as gallons, of the liquid passing through it at varying rate; after passing the meter the liquid passes through the orifice O and thence to destination after receiving the first liquid from the line or pipe L. Branching from the pipe P in advance of orifice O, is the pipe or line Q communicating through an orifice $O_1$ and control valve V with the mixing chamber A. D is a double-acting diaphragm controller for the valve V; one side of its diaphragm is subjected through the liquid connection $d$ to pressure in the pipe P on the downstream side of the orifice O, and the other side of the diaphragm is subjected through the connection $d_1$ to the pressure in the pipe Q on the downstream side of the orifice $O_1$, whereby the opening of the valve V is automatically varied in such way that a constant fraction of the main stream in pipe P passes through the pipe Q into the mixing chamber A at a rate of delivery thereto varying in accord with the variations of the rate of flow of the main stream through line P.

Into the mixing chamber A there is discharged through the conduit E1 the first liquid, for example sulphuric acid, a quantity of which, suitable for any predetermined period or length of service, is stored in a reservoir a, Fig. 2, disposed in the tank T of the intermittent proportioner of Fig. 1 which, for example, may be of the character described in Kittredge and Rohlin Patent No. 2,155,943, April 25, 1939, with Figs. 4, 5 and 6 of which present Fig. 2, with like reference characters, corresponds. It suffices for present purposes to state the apparatus of aforesaid patent is characterized by the fact that through the pipe f, Fig. 2 hereof, air is blown or forced, pursuant to control by the meter M, and the first liquid hereof, acid or chemical solution, is at certain times, under certain conditions and in certain quantities or doses, discharged over the weir e, passing by gravity through the discharge outlet e' to and through the aforesaid pipe E1, Fig. 1, to mixing chamber A. The characteristic action is that said first liquid, in event of failure of the primary proportioning apparatus and/or control, underfeeds and never overfeeds through the line E1 to the mixing chamber A.

The air supplied through the pipe F, Fig. 1, corresponding with pipe f of Fig. 2, is supplied through manually or otherwise set or adjusted reducing valve V1 by the air compressor or blower B, driven by the electric motor C, such for example as an alternating current induction motor, energized from the supply conductors c, c1 through switches s, s1; rotary contact or brush b of switch s is driven by the movable or rotating element of the meter M through the shaft or mechanical coupling i, and rotary brush or contact b1 of the switch s1 is driven by the motor C through speed-reducing gearing in gear box j. The contact b in switch s engages in succession the stationary switch contacts k and k1 connected, respectively, with the contacts k2 and k3 of switch s1 engaged in succession by the rotary contact b1; the contact b is connected with the line conductor c1 and the contact b1 is connected through the conductor c2 with the motor C with which directly connects the line conductor c. The ends of contacts k2, k3 overlap, and to that extent are simultaneously engaged by brush b1; contacts k, k1 may, but need not, overlap, and so brush b may never engage them simultaneously, or may engage them simultaneously during traverse of their in any event short overlap.

With the switch parts in the positions illustrated, the motor C is deenergized, the air compressor B is idle and delivers no air through the reducing valve V1 and the connection F to the primary proportioner T; when the contact b rotates clockwise into engagement with contact k1 while contact b1, which rotates counter-clockwise, is in engagement with contact k3, the position illustrated, motor C is energized, and air is delivered under suitable pressure through connection F to the apparatus of the primary feed proportioner T; and when contact b is in engagement with contact k1, while contact b1 is in engagement with contact k2, motor C again is deenergized and no air pressure is applied to the feed proportioner T.

For example, assuming brush b makes one complete revolution in not less than two minutes for each ten gallons through meter M or one-half revolution in not less than one minute for each five gallons through the meter, which period of time is the shortest required for flow of say five gallons through the meter at the highest rate of flow that will be or is ever likely to be encountered within the highest and lowest limits of load of the system; and if the speed of motor C be, say, 1750 R. P. M., and the ratio of gear reduction to the contact b1 be such that the latter then makes one-half revolution in two minutes, the motor C will run not less than two minutes, but is deenergized at or after completion of such two-minute run whenever at switch s brush b moves onto that one of contacts k, k1 which at the time is not through switch s1 connected with conductor c2; so causing application of air pressure to the primary feed proportioner T to cause delivery of acid or other first liquid through the line E1 in a volume or dose of magnitude required for each five-gallon unit of volume of liquid passed through line P or meter M.

The switch s determines energization and deenergization of motor C, through switch s1, for each unit of volume, for example five gallons, of liquid passing through the meter M; and switch s1 is in effect a time-controlled switch which insures, for each such exemplary volume of five gallons passing through the meter M, the motor C shall run for at least two minutes, for example, which also is twice the minimum length of time for one-half revolution of the brush b of switch s; the motor C in effect acts, through the reduction gearing j, as an electric clock controlling rotation of the brush b1, the relation of which to the contacts k2, k3 of switch s1 is such that, as aforesaid, the motor will run at least aforesaid two minutes which is at least sufficient to insure for each five gallons passing through meter M a feed through the line E1 to the mixing chamber A of a charge of the first liquid or acid sufficient in comparison with each five gallons passing through the meter M, suitably and properly to proportion the acid thereto. The action is substantially the same when the motor C is an asynchronous or induction motor.

In brief, switch s, effective in deenergizing motor C for each five gallons flow in pipe P and at intervals, not less than say one minute, varying with the rate of flow of each of the five-gallon units, is in series with time-controlled switch s1, preventing rupture of the motor circuit in less than say two minutes, but causing eventual rupture of that circuit on occurrence, at a time after the motor has operated two minutes, of termination of passage of a five-gallon unit through meter M; whereby, whether the time required for a unit of five gallons to pass meter M be a minimum of one minute or much more than that minimum, motor C always will drive compressor B long enough to permit feed of a proper and predetermined amount or dose of acid fixed by the air pressure delivered by reducing valve V1 to mixing chamber A for each five gallons of flow in pipe P at meter M.

In meeting in mixing chamber A with the predetermined fraction of the main stream of liquid passing the valve V, each charge of acid, proper for each five gallons through meter M, comes into mixture with the diluent fraction, of the main stream, delivered through pipe Q, and the concentration or proportion of acid in the diluted mixture loses or begins to lose its intermittent character; the mixture passes from the bottom of mixing chamber A into the storage chamber G of the dilution system or tank H. The volume of the diluted mixture, for a time impounded in and flowing through the storage tank G, is relatively great; desirably so great that the concentration of the acid or the like in the diluted mixture no longer fluctuates or no longer is intermittent, but has become continuously substantially constant or uniform.

The diluted mixture discharges from the upper end of the storage tank or compartment G into the upper end of the supply chamber I from whose bottom the diluted mixture of now constant acid concentration is continuously drawn off through valve V2 and pipe m to the suction side of the feed pump J continuously driven by the motor K. Pump J discharges through the strainer N and the line L through a check-valve S, such as a vertical ball check, to the conduit or pipe P through which passes the main stream of the first liquid, such as aforesaid boiler feed water.

In order that the rate of flow or discharge from the storage volume G to the supply chamber I shall be sensitive and promptly responsive to momentary changes in the rate of delivery of dilution water into mixing chamber A from conduit Q, there is provided at the upper end of storage tank G a weir W, which conveniently may be of form to constitute an annular space around the upper portion of the mixing chamber A, and into which the diluted mixture from storage space G rises and overflows weir W into supply chamber I. The storage volume ahead of weir W, within said annular space, has small or minimum storage capacity, so insuring the sensitiveness and prompt response of the discharge into chamber I to aforesaid momentary changes in the rate of delivery of dilution water into chamber A. To provide for overflow of an excess discharge from chamber G to weir W there is provided the overflow pipe o communicating with the space to the left of the partition or weir w which rises suitably higher than weir W.

From the discharge side of the feed pump J a variable fraction of the total discharge of pump J is returned through the conduit or pipe p, as shown, into the mixing chamber A, or into the storage tank G; in the return or recirculating line p is a recirculation control valve V3, whose control rod or stem r extends upwardly through and terminates above the tube t, overflow from which may pass through the pipe u into chamber I. The valve rod r is controlled by the float R, within the supply chamber I, itself having small or minimum clearance from the wall of chamber I. Float R actuates and controls the lever v, pivoted at v1, which in turn actuates and controls the valve stem or rod r, subject to a suitable biasing action on the part of spring x. As float R rises in response to rise of level of the liquid in supply chamber I, the valve V3 is actuated in sense and to extent suitably to reduce the recirculation through line p; and upon fall of the float R in response to fall of level of liquid in the chamber I, spring x, theretofore compressed by rise of float R, assisted by the weight of the float R, causes valve V3 to be actuated in sense and to extent suitably to increase recirculation through the line p.

The recirculation to mixing chamber A or storage tank G has the effect to produce turbulence of the mixture, so in effect stirring it, the more quickly and certainly to attain constancy of concentration of the first liquid, as acid, in the mixture before its discharge to the supply chamber I.

While the line p is shown as branched from the line L below the orifice or check S and V3 in line p, it shall be understood the valve V3, along with or in substitution for the orifice or valve S, may be directly in the line L and not in line p, which last-named will branch from line L at a point below valve V3 then in line L.

Because of aforesaid large diameter or horizontal cross section of float R as compared with the diameter or horizontal cross section of the chamber I, there is reduced or minimized the variation in volume of liquid required in the feed or supply chamber I to afford different rates of feed through line L to the main pipe line P.

Overfeeding or extreme overfeeding of acid to the main stream in pipe P, in the herein described system, is impossible because of preferable concurrence of small volume of liquid stored within and ahead of the weir W and the small volume of liquid utilized in the float or supply chamber I, to which prevention of overfeeding by either or both of said small volumes the intermittent proportioning of the acid by the primary acid feeding and proportioning apparatus T also contributes.

Accordingly my system, either in the form illustrated and described or in any modification thereof within the spirit of my invention, is broadly characterized by dilution of an intermittently fed first liquid with a diluent liquid continuously flowing at constant or variable rate, to effect a mixture, having a concentration respecting its intermittently fed component which is continuously substantially constant and free from fluctuations in degree. More particularly, the diluent component of the mixture preferably is a predetermined constant fraction of a second liquid flowing at constant or varying rate, or the diluent may be any other suitable liquid of quantity proportional to the quantity of the second liquid, and in either case rate of delivery of the diluent is in accord with the constant or varying rate of flow of the second liquid; and the first liquid is fed to mixture with the diluent in successive amounts or volumes at a frequency of intermittence, changing as the rate of flow of the second liquid varies, such that the first liquid is at first or primarily proportioned to the amount or volume of the second liquid and such that finally, as a component of the mixture, it is continuously fed to the second liquid at constant concentration in the mixture and at rate varying in accord with variation in rate of flow of the second liquid.

What I claim is:

1. A method of continuously proportioning a liquid to a stream of another liquid comprising primarily feeding the first-named liquid intermittently in successive amounts proportioned to the flow of said second-named liquid, mixing said intermittently fed liquid with a stream of liquid diluent delivered at a rate in accord with the rate of flow of said second-named liquid, accumulating a large volume of said mixture, while flowing, to effect uniformity of concentration of said first-named liquid in the mixture from said accumulated volume thereof, and delivering said mixture into mixture with said second-named liquid.

2. A method of continuously proportioning a liquid to a stream of another liquid comprising primarily feeding the first-named liquid intermittently in successive amounts, each in the same proportion to each of successive volumes of said second-named liquid, mixing said intermittently fed liquid with a stream of liquid diluent delivered at a rate in accord with the rate of flow of said second-named liquid, accumulating a large volume of said mixture, while flowing, to effect uniformity of concentration of said first-named liquid in the mixture, and delivering said mixture from said accumulated volume thereof to said second-named liquid.

3. A method of continuously proportioning a liquid to another liquid comprising primarily feeding the first-named liquid intermittently in successive amounts each in the same proportion to each of successive volumes of said second-named liquid, mixing said intermittently fed liquid with a predetermined fraction of said second-named liquid delivered at a rate in accord with the rate of flow of said second-named liquid, effecting constancy of concentration of said first-named liquid in the mixture, and delivering said mixture to said second-named liquid.

4. A method of continuously proportioning a liquid to a stream of another liquid comprising primarily feeding the first-named liquid intermittently in successive amounts proportioned to the flow of said second-named liquid, mixing said intermittently fed liquid with a stream of liquid diluent delivered at a rate in accord with the rate of flow of said second-named liquid, maintaining a volume of the mixture sufficient to effect constancy of concentration of said first-named liquid in said mixture, and delivering said mixture from said volume thereof to said second-named liquid.

5. A method of continuously proportioning a liquid to a stream of another liquid comprising primarily feeding the first-named liquid intermittently in successive amounts proportioned to successive amounts of said second-named liquid, diluting said intermittently fed liquid within a stream of liquid delivered at a rate in accord with the rate of flow of said second-named liquid, impounding the resultant mixture, while flowing, in volume sufficient to effect constancy of concentration of said first-named liquid in said mixture, and delivering the mixture from the impounded volume thereof to said second-named liquid.

6. A method of continuously proportioning a liquid to a stream of another liquid comprising primarily feeding the first-named liquid intermittently in successive amounts proportioned to successive amounts of said second-named liquid, diluting said intermittently fed liquid with a stream of liquid delivered at a rate in accord with the rate of flow of said second-named liquid, impounding the mixture, while flowing, in volume sufficient to effect constancy of concentration of said first-named liquid in the mixture, and delivering the mixture from the impounded volume thereof to said second-named liquid in quantity varying promptly in response to variation in rate of flow of said second-named liquid.

7. A method of continuously proportioning a liquid to another liquid comprising primarily feeding the first-named liquid intermittently in successive amounts in proportion to the flow of said second-named liquid, withdrawing from the stream of said second-named liquid a predetermined fraction thereof whose rate of flow is in accord with the rate of flow of said second-named liquid, mixing said intermittently fed liquid with said fraction, effecting constancy of concentration of said first-named liquid in the mixture thereof with said fraction, and returning said fraction in mixture with said first-named liquid into mixture with said second-named liquid.

8. A method of continuously proportioning liquid to a stream of another liquid comprising primarily feeding the first-named liquid intermittently in successive amounts in proportion to the flow of said second-named liquid, mixing said intermittently fed liquid with a stream of liquid diluent delivered at a rate in accord with the rate of flow of said second-named liquid, effecting constancy of concentration of said first-named liquid in the mixture, and withdrawing said mixture and feeding it to said second-named liquid in quantity varying in prompt response to variation in rate of delivery of said liquid diluent.

9. A method of continuously proportioning a liquid to another liquid comprising primarily feeding the first-named liquid intermittently in successive amounts proportioned to the flow of said second-named liquid, mixing said intermittently fed liquid with a predetermined fraction of said second-named liquid delivered at a rate in accord with the rate of flow of said second-named liquid, effecting constancy of concentration of said first-named liquid in the mixture, and withdrawing said mixture and feeding it to said second-named liquid in quantity varying in prompt response to variation in rate of delivery of said fraction to mixture with said first-named liquid.

10. A method of continuously proportioning a liquid to another liquid comprising primarily feeding the first-named liquid intermittently in successive amounts proportioned to the flow of said second-named liquid, mixing said intermittently fed liquid with a predetermined fraction of said second-named liquid delivered at a rate in accord with the rate of flow of said second-named liquid, impounding the mixture, while flowing, in volume sufficient to effect constancy of concentration of said first-named liquid in the mixture, withdrawing from the impounded mixture a stream thereof in quantity promptly responsive to variations in rate of delivery of said fraction to the mixture and delivering it to a supply of said mixture of volume small as compared with said impounded volume, and feeding the mixture from said supply to said second-named liquid.

11. A method of continuously proportioning a liquid to another liquid comprising primarily feeding the first-named liquid intermittently in successive amounts proportioned to the flow of said second-named liquid, mixing said intermittently fed liquid with a predetermined fraction of said second-named liquid delivered at a rate in accord with the rate of flow of said second-named liquid, impounding the mixture, while flowing, in volume sufficient to effect constancy of concentration of said first-named liquid in the mixture, withdrawing from the impounded volume thereof a stream of the mixture in quantity promptly responsive to variations in rate of delivery of said fraction to the mixture and delivering it to a supply of said mixture of volume small as compared with said impounded volume, feeding the mixture from said supply to said second-named liquid, and returning to the mixture in advance of said supply thereof a portion of the mixture withdrawn from said supply in quantity and at rate to stir the mixture.

12. Liquid feeding and proportioning apparatus comprising a mixing chamber, means for intermittently feeding to said mixing chamber a liquid in successive amounts proportioned to the flow of a stream of a second liquid, means delivering a stream of liquid diluent to said mixing chamber at a rate varying in accord with the rate of flow of said second-named liquid, a storage chamber receiving the mixture from said first-named chamber and having such relatively large capacity that uniformity of concentration of said first-named liquid in the mixture is effected, and means for delivering the mixture from said storage chamber into mixture with said second-named liquid.

13. Liquid feeding and proportioning apparatus comprising a mixing chamber, means for intermittently feeding into said chamber a liquid in successive amounts proportioned to successive volumes of a second liquid, means for withdrawing from the stream of said second liquid and delivering to said mixing chamber a predetermined fraction thereof flowing at a rate in accord with the rate of flow of said second liquid, a chamber for impounding a volume of the mixture, while flowing, sufficient to effect constancy of concentration of said first-named liquid in the mixture, and means for feeding the mixture from the impounded volume thereof into mixture with said second-named liquid.

14. Liquid feeding and proportioning apparatus comprising a mixing chamber, means for intermittently feeding to said chamber a liquid in successive amounts proportioned with respect to successive amounts of a second liquid continuously flowing at varying rate, means for withdrawing from the stream of said second liquid and feeding to said mixing chamber a predetermined fraction thereof at rate varying in accordance with the rate of flow of said second liquid, a chamber for impounding a volume of the mixture, while flowing, sufficient to effect constancy of concentration of said first-named liquid in the mixture, a supply chamber into which said second-named chamber discharges the mixture, and means for withdrawing mixture from said supply chamber and feeding it into mixture with said second-named liquid.

15. Liquid feeding and proportioning apparatus comprising a mixing chamber, means for intermittently feeding to said chamber a liquid in successive amounts proportioned with respect to successive volumes of a second liquid continuously flowing at varying rate, means for withdrawing from the stream of said second liquid and feeding to said mixing chamber a predetermined fraction thereof at rate varying in accordance with the rate of flow of said second liquid, a chamber for impounding a volume of the mixture, while flowing, sufficient to effect constancy of concentration of said first-named liquid in the mixture, a supply chamber, means for discharging mixture from said second-named chamber into said supply chamber comprising a weir the volume ahead of which is so small as to insure the discharge over the weir into said supply chamber shall promptly respond in quantity and rate of flow to variations in quantity and rate of flow of said fraction, and means for withdrawing mixture from said supply chamber and feeding it into mixture with said second-named liquid.

16. Liquid feeding and proportioning apparatus comprising a mixing chamber, means for intermittently feeding to said chamber a liquid in successive amounts proportioned with respect to successive volumes of a second liquid continuously flowing, means for withdrawing from the stream of said second liquid and feeding to said mixing chamber a predetermined fraction thereof at rate in accord with the rate of flow of said second liquid, a chamber for impounding a volume of the mixture, while flowing, sufficient to effect constancy of concentration of said first-named liquid in the mixture, a supply chamber, means for discharging mixture from said second-named chamber into said supply chamber comprising a weir the volume ahead of which is so small as to insure the discharge over the weir into said supply chamber shall promptly respond in quantity and rate of flow to variations in quantity and rate of flow of said fraction, said supply chamber having a volume small compared with the volume of said mixture-impounding chamber, and means for withdrawing mixture from said supply chamber and feeding it into mixture with said second-named liquid.

17. Liquid feeding and proportioning apparatus comprising a mixing chamber, means for intermittently feeding into said chamber a liquid in successive amounts proportioned to successive volumes of a second liquid flowing, means for withdrawing from the stream of said second liquid and delivering to said mixing chamber a predetermined fraction thereof flowing at a rate in accord with the rate of flow of said second liquid, a chamber for impounding a volume of the mixture, while flowing, sufficient to effect constancy of concentration of said first-named liquid in the mixture, a supply chamber into which said mixture-impounding chamber discharges having a capacity small compared with the capacity of said mixture-impounding chamber, means for withdrawing mixture from said supply chamber and delivering it to said second-named liquid, and means responsive to the quantity of liquid in said supply chamber for returning into the mixture in advance of said supply chamber a portion of the mixture withdrawn from said supply chamber to stir the mixture.

18. Liquid feeding and proportioning apparatus comprising a mixing chamber, means for intermittently feeding into said chamber a liquid in successive amounts proportioned to successive volumes of a second liquid, means for withdrawing from the stream of said second liquid and delivering to said mixing chamber a predetermined fraction thereof flowing at a rate in accord with the rate of flow of said second liquid, a chamber for impounding a volume of the mixture, while flowing, sufficient to effect constancy of concentration of said first-named liquid in the mixture, a supply chamber into which said mixture-impounding chamber discharges having a capacity small compared with the capacity of said mixture-impounding chamber, means for withdrawing mixture from said supply chamber and delivering it to said second-named liquid, a float in said supply chamber, having a cross-section approximately equal to the cross-section of the supply chamber, and valve means, controlled by said float, through which there is returned into the mixture in advance of said supply chamber a varying portion of the liquid to stir the mixture.

19. Liquid feeding and proportioning apparatus comprising a mixing chamber, means for intermittently feeding into said chamber a liquid in successive amounts proportioned to successive volumes of a second liquid, means for withdrawing from the stream of said second liquid and delivering to said mixing chamber a predetermined fraction thereof flowing at a rate in accord with the rate of flow of said second liquid, a chamber for impounding a volume of the mixture, while flowing, sufficient to effect constancy of concentration of said first-named liquid in the mixture, a supply chamber into which said mixture-impounding chamber discharges having a capacity small compared with the capacity of said mixture-impounding chamber, means for withdrawing mixture from said supply chamber and delivering it to said second-named liquid, a float in said supply chamber, having a cross-section approximately equal to the cross-section of the supply chamber, valve means controlled by said float through which there is returned into the mixture in advance of said supply chamber a varying portion of the liquid withdrawn from said supply chamber to stir the mixture, to procure small or minimum variation in the volume of the mixture in said supply chamber required to afford varying rate of feed of said mixture from said supply into said second-named liquid, and means for restricting the discharge of mixture from said mixture-impounding chamber into said supply chamber to effect prompt response of said discharge in quantity and rate of flow to the quantity and rate of flow of said fraction.

20. Liquid feeding and proportioning apparatus comprising a mixing chamber, means for intermittently feeding into said chamber a liquid in successive amounts proportioned to successive volumes of a second liquid, means for withdrawing from the stream of said second liquid and delivering to said mixing chamber a predetermined fraction thereof flowing at a rate in accord with the rate of flow of said second liquid, a chamber for impounding a volume of the mixture, while flowing, sufficient to effect constancy of concentration of said first-named liquid in the mixture, a supply chamber into which said mixture-impounding chamber discharges having a capacity small compared with the capacity of said mixture-impounding chamber, means for withdrawing mixture from said supply chamber and delivering it to said second-named liquid, a float in said supply chamber, having a cross-section approximately equal to the cross-section of the supply chamber, valve means controlled by said float through which there is returned into the mixture in advance of said supply chamber a varying portion of the liquid withdrawn from said supply chamber to stir the mixture, and a weir over which the mixture flows into said supply chamber from said mixture-impounding chamber, the volume of mixture ahead of the weir being restricted sufficiently to render the discharge into the supply chamber promptly responsive in amount and rate of flow to the amount and rate of flow of said fraction into said mixing chamber.

ARTHUR E. KITTREDGE.